(12) United States Patent
Karri

(10) Patent No.: US 9,155,004 B2
(45) Date of Patent: Oct. 6, 2015

(54) FAST RESELECTION FROM A CURRENT CELL TO A HIGHER-PRIORITY CELL IN WIRELESS COMMUNICATION

(71) Applicant: Apple Inc., Cupertino, CA (US)

(72) Inventor: Sai Sravan Bharadwaj Karri, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 13/766,175

(22) Filed: Feb. 13, 2013

(65) Prior Publication Data

US 2014/0066067 A1    Mar. 6, 2014

Related U.S. Application Data

(60) Provisional application No. 61/695,833, filed on Aug. 31, 2012.

(51) Int. Cl.
*H04W 36/00* (2009.01)
*H04W 88/06* (2009.01)
*H04W 36/14* (2009.01)

(52) U.S. Cl.
CPC ...... *H04W 36/0022* (2013.01); *H04W 36/0083* (2013.01); *H04W 36/14* (2013.01); *H04W 88/06* (2013.01)

(58) Field of Classification Search
USPC .......... 455/436, 39, 500, 501, 502, 437, 442, 455/435.3; 370/332, 350, 331, 241, 252, 370/310, 328, 329, 335, 345, 464, 498, 503, 370/507
See application file for complete search history.

(56) References Cited

U.S. PATENT DOCUMENTS 8,340,671 B2    12/2012 Lee et al.
2009/0247161 A1*   10/2009 Pani et al. .............. 455/435.3
2010/0260147 A1*   10/2010 Xing et al. ................ 370/332
2012/0052864 A1     3/2012 Swaminathan et al.
2012/0172041 A1*    7/2012 Krishnamurthy et al. .... 455/436
2012/0302241 A1    11/2012 Klingenbrunn et al.

OTHER PUBLICATIONS

International Search Report and Written Opinion from PCT/US2013/056628, dated Aug. 26, 2013, Apple Inc, pp. 1-14.
Panasonic, "Cell Reselection and Evaluation During RRC Connection Procedure", pp. 1-3, Jan. 14-18, 2008, Sevilla, Spain.
InterDigital, "Triggering of Cell Reselection in Cell_FACH", pp. 1-6, Aug. 18-22, 2008, Jeju, Korea.
Renesas Mobile Europe Ltd, Teliasonera, "Inter-RAT UMTS to LTE Reselection", pp. 1-26, May 9-13, 2011, Barcelona, Spain.
Office Action from Taiwanese Application No. 102131380, issued Feb. 12, 2015, English and Chinese versions, pp. 1-14.
"3rd Generation Partnership Project; Technical Specification Group Radio Access Network User Equipment (UE) procedures in idle mode and procedures for cell reselection in connected mode", 3GPP TS 25.304 v10.5.0,. Jun. 2012, pp. 1-52.

* cited by examiner

*Primary Examiner* — Charles Appiah
*Assistant Examiner* — Alexander Yi
(74) *Attorney, Agent, or Firm* — Meyertons, Hood, Kivlin, Kowert & Goetzel, P.C.; Jeffrey C. Hood; Mark K. Brightwell

(57) ABSTRACT

A method and mechanism for operating user equipment to enable efficient reselection from a first cell conforming to a first wireless standard to a second cell conforming to a second wireless standard. The second standard may require a higher transmission rate for packet-switched data than the first standard. While camping on the first cell, the user equipment makes measurements of received power from the second cell. A reselection timer is started when a measurement is detected that is sufficiently strong. In response to an access state transition to a non-active protocol state (such as UMTS-PCH), the UE saves the timer value. When data becomes available for transmission, an additional measurement is made on the second cell, and reselection to the second cell may be performed immediately if the additional measurement and the saved timer value pass one or more reselection criteria.

14 Claims, 7 Drawing Sheets while camped on a first base station that is configured to communicate wirelessly according to a first wireless communication standard, perform the following operations: 505 initiate a search procedure to detect a second base station that is configured to communicate wirelessly according to a second wireless communication standard 510 start a reselection timer for the second base station in response to determining that a current measurement of signal strength of the second base station is stronger than a threshold value 515 in response to receiving a request for a data transfer to be performed, save information including at least a remaining time value of the reselection timer, and perform the data transfer according to the first wireless communication standard using the first base station 520 in response to transitioning to an non-active protocol state (after completing the data transfer), perform an additional measurement of the signal strength of the second base station, and determine if the second base station satisfies one or more reselection criteria based at least on the additional measurement and the saved remaining time value of the reselection timer 525 in response to determining that the second base station satisfies the one or more reselection criteria, reselect to the second base station to enable data transfers with the second base station according to the second wireless communication standard 530

FIG. 5

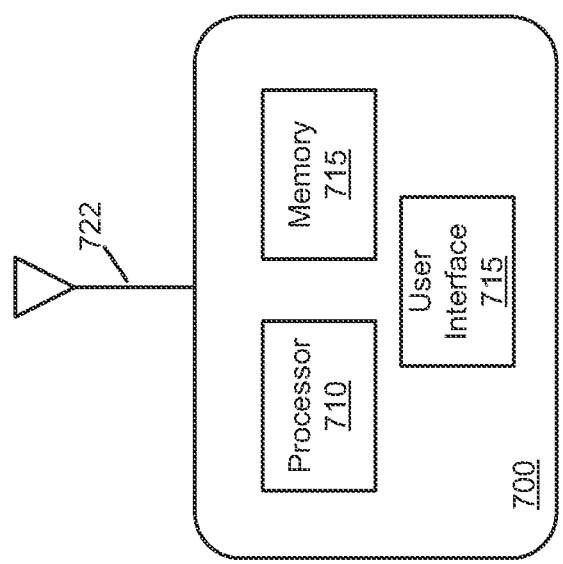

FAST RESELECTION FROM A CURRENT CELL TO A HIGHER-PRIORITY CELL IN WIRELESS COMMUNICATION

PRIORITY CLAIM DATA

This application claims the benefit of priority to U.S. Provisional Application No. 61/695,833, filed on Aug. 31, 2012, entitled "FAST LTE MEASUREMENTS DURING ACCESS-STATE TRANSITIONS IN W-CDMA TO ACCELERATE BACKGROUND DATA TRANSFERS", invented by Sai Sravan Bharadwaj Karri. That Provisional Application is hereby incorporated by reference in its entirety as though fully and completely set forth herein.

FIELD

The presently described embodiments relate to the field of wireless communication, and more particularly to a system and method for accelerating background data transfers for wireless devices capable of communicating according to more than one wireless communication standard.

DESCRIPTION OF THE RELATED ART

Mobile devices communicate with wireless networks according to wireless communication standards such as UMTS and LTE. UMTS is a third generation mobile cellular system for networks based on the GSM standard. (UMTS is an acronym for Universal Mobile Telecommunications System.) LTE (Long Term Evolution) is a standard for wireless communication of high-speed data for mobile devices and data terminals. For more information on UMTS and/or LTE, please refer to the following standards.

- 3GPP TS 36.133—Evolved Universal Terrestrial Radio Access (E-UTRA); Requirements for support of radio resource management.
- 3GPP TS 36.331—Evolved Universal Terrestrial Radio Access (E-UTRA); Radio Resource Control (RRC); Protocol specification.
- 3GPP TS 25.304—User Equipment (UE) procedures in idle mode and procedures for cell reselection in connected mode.

Currently most networks use LTE to emulate hotspots for premium data services and redirect the user equipment (UE) to UMTS for any circuit-switched (CS) based services. (The terms "user equipment" and "mobile device" are used herein as synonyms.) Though packet-switched (PS) data services are supported in UMTS networks, UMTS networks cannot handle higher data rates for multiple users due to the limitation on the number of orthogonal codes, etc. Thus, to ensure optimal data connectivity, the UE preferably moves (or is moved) to LTE for any applications requiring higher data rates.

While camped on UMTS, a UE is typically moved to paging channel (PCH) or forward access channel (FACH) by the network when there is no data activity, and to data channel (DCH) when there is data to transfer. The access state transitions while camped on UMTS involve reconfiguring radio bearers every time an access state change is signaled, and hence higher control plane data overhead for the Node B and UE. (The base station in UMTS is referred to as "Node B" and in LTE it is referred to as e-NodeB.) Moving from UMTS to LTE helps since the UE can make use of Connected Discontinuous Reception (CDRX) to save power as well as perform fast data transfer on a number of PDSCH channels whenever data is available, for both forward and reverse links. (PDSCH is an acronym for Physical Downlink Shared Channel.)

Inter RAT LTE reselections in FACH, PCH and Idle allow a UE in UMTS to reselect to LTE. (See 3GPP TS 25.304. RAT is an acronym for Radio Access Technology.) Any high priority cell reselection to an LTE cell will be governed by the timers like T_measureUTRA, T_higher_priority search and by the number of layers configured, etc. As described in 3GPP TS 36.133, the UE shall search every layer of higher priority at least every T_higher_priority search=(60*Nlayers) seconds, where Nlayers is the total number of configured higher priority E-UTRA, UTRA FDD, UTRA TDD carrier frequencies. The UE may be required to measure high priority cells at least every T_measureUTRA seconds.

Most of the time these parameters are configured in such a way that the UE takes about 9 to 12 seconds to switch to LTE with no access state transitions. Also, T_high priority search, the UE's search measurements and the T-reselection timers are reset every time there is an access state transition, which implies extra delay in reselecting back to LTE between access state transitions. (For example, an access state transition from DCH to PCH occurs at the boundary between blocks 15 and 16 in FIG. 1.) So if there is periodic or intermittent background data generated from an application repeatedly within 5 to 10 seconds, the UE might be unable to reselect to UMTS because of the above conditions, which in turn will cause even more delay in finishing the data transfer.

FIG. 1 shows an example of the UE being stuck in UMTS. The received signal code power (RSCP) of a UMTS base station, i.e., base station A, is assumed to be relatively constant at −100 dBm. (PSC refers to primary scrambling code.) The reference signal received power RSRP of an LTE base station, i.e., LTE base station B, starts at −110 dBm and then increases to −90 dBm. (The increase reflects the scenario where user equipment enters into a region of good LTE coverage. While the increase is shown as being an instantaneous step, more typically the transition may be smooth.) In FIG. 1, the letters A and B carry no technical meaning and are used merely to distinguish the two base stations.

Initially, the UE is in the UMTS-PCH state as shown at 10. The UE then initiates an LTE detection search 11. The LTE detection search may be initiated because the network configured the UE to measure high priority LTE cells. The LTE detection search detects the presence of the LTE base station B, e.g., as described in the 3GPP TS 36.133 standard.

In response to detecting the presence of the LTE base station B, the UE makes a measurement 12 of the power level of the base station B. Measurement 12 is labeled as "LTE Meas 1" because it represents a first measurement of the power of the LTE base station B. The UE compares the measurement 12 to a power threshold to determine if the LTE base station B is sufficiently strong to support reliable data communication. For the illustrated example, it is assumed that the measurement 12 is not sufficiently strong. After a certain amount of time has traversed (e.g., after a number of DRX cycles), the UE makes a second measurement, i.e., measurement 13, of the power level of the LTE base station B. Since the power level of the LTE base station has increased (from −110 dBm to −90 dBm in the illustrated example) in the time since the first measurement 12, the second measurement 13 will pass the power threshold test, and the T_reselection timer 14 for the LTE base station B can be started. The UMTS standard requires a certain minimum amount of time to transpire before reselecting to the LTE base station. The T_reselection timer is used to enforce that minimum time condition. (The T_reselection timer is set in order to prevent extra loading on the network as well as power on the UE caused due to the UE ping-ponging between different base stations. Without this timer, the UE might end up always in a reselection/searching state and not actually registering to a network for service. Thus, the UE will wait and make sure the other base station to which it is going to reselect is stronger than the present base station for a period of time, and then move to the other base station.) If a small amount of data arrives (e.g., from an application running on the UE) after the T_reselection timer has started, the UE will discard the T_reselection timer, move to the data channel DCH (as indicated at block 15), complete transfer of the data, and transition back to the UMTS-PCH state 16. Thus, the value of the T-reselection timer and the LTE measurements will be discarded, and the UE does not reselect to the LTE base station B.

The UMTS standard also requires that two successive measurements of an LTE base station be sufficiently strong before allowing reselection to that LTE base station.

From the UMTS-PCH state 16, the UE initiates an LTE detection search 17. (The LTE detection search 17 is similar to the LTE detection search 11.) The LTE detection search 17 operates from a state of ignorance because the previously acquired LTE measurements 12 and 13 and the T_reselection timer value have been discarded. Since the power level of the LTE base station B has remained high (i.e., at −90 dBm), the LTE detection search 17 will detect the presence of the LTE base station B. The UE will then generate a measurement 18 of the power level of the LTE base station B. The measurement 18 is labeled as "LTE Meas 1" because it is interpreted as being a first measurement (since the previous measurements have been forgotten). After waiting a certain amount of time, the UE acquires a second measurement 19 of the LTE base station B, and starts a T_reselection timer 20 for the LTE base station B. Again a small amount of data arrives after the start of the T-reselection timer 20, and the UE moves to the DCH state to transfer the data as shown at block 21. The T_reselection timer is immediately discarded when the UE starts moving to DCH. The UE completes the transfer of the data, returns again to the UMTS-PCH state (as indicated at 22), and fails to reselect to the LTE base station B. Thus, when the pattern of data to be transmitted is bursty, it may take a long time for the reselection conditions to be met.

Therefore, there exists a need for systems and methods enabling a UE to reselect from a UMTS cell to an LTE cell in a more efficient way. More generally, there exists a need for systems and methods enabling a UE to reselect from a base station that uses a first communication standard to a second base station that uses a second communication standard, where the second communication standard requires the transfer of packet-switched data at a higher data rate than the first communication standard.

SUMMARY

Among other things, this disclosure describes various methods for operating user equipment to enable efficient reselection from a first cell conforming to a first wireless communication standard to a second cell conforming to a second wireless communication standard. While camping on a first base station that is configured to communicate wirelessly according to the first wireless communication standard, the user equipment may perform the following operations.

The user equipment may initiate a search procedure to detect a second base station that is configured to communicate wirelessly according to the second wireless communication standard.

The user equipment may start a reselection timer for the second base station in response to determining that a current measurement of signal strength of the second base station is stronger than a threshold value.

In response to receiving a request for a data transfer to be performed, the user equipment may save at least a remaining time value of the reselection timer, and perform the data transfer according to the first wireless communication standard.

In response to transitioning to a non-active protocol state after completing the data transfer, the user equipment may perform an additional measurement of the signal strength of the second base station, and determine if the second base station satisfies one or more reselection criteria based at least on the additional measurement and the saved remaining time value.

In response to determining that the second base station satisfies the one or more of reselection criteria, the user equipment may reselect to the second base station to enable data transfers with the second base station according to the second wireless communication standard.

BRIEF DESCRIPTION OF THE DRAWINGS

A better understanding of the present embodiments can be obtained when the following detailed description of the preferred embodiment is considered in conjunction with the following drawings.

FIG. 5 illustrates an example of a method for reselecting from a first cell that conforms to a first wireless communication standard to a second cell that conforms to a second wireless communication standard.

FIG. 7 illustrates one realization of a computer system 700 configured to perform any of the various method embodiments described herein.

Figure 1:
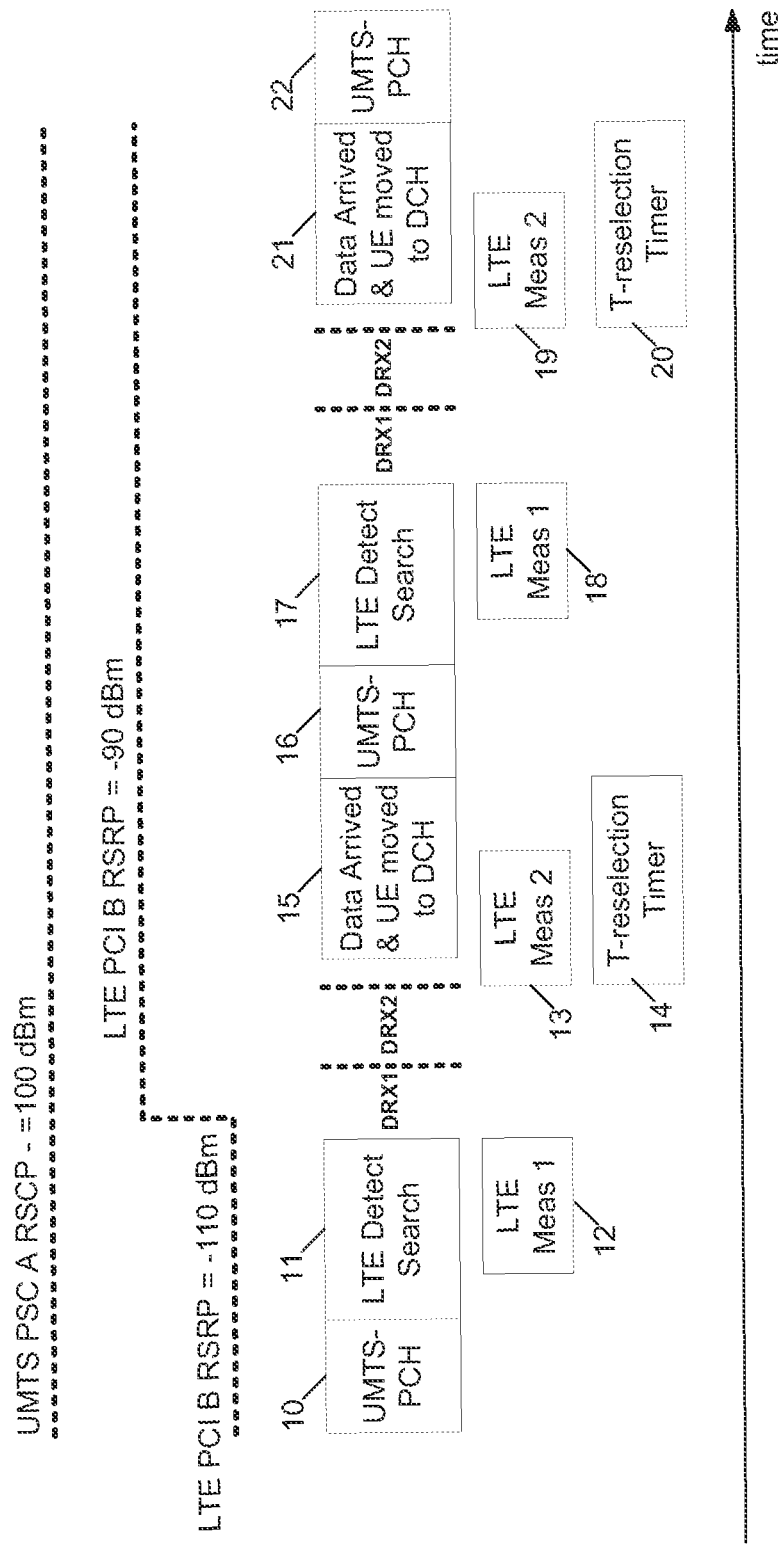
FIG. 1 shows an example of a mobile device being stuck on a UMTS cell and unable to reselect to an LTE cell due to the intermittent arrival of small amounts of data to be transmitted.

While embodiments described herein susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION

Acronyms

The following acronyms are used in the present Provisional Patent Application.
3GPP: 3rd Generation Partnership Project
CDMA: Code Division Multiple Access
CDRX: Connected Discontinuous Reception
CS: Circuit Switched
DCH: Data Channel EDGE: Enhanced Data rates for GSM Evolution
GNSS: Global Navigation Satellite System
GPS: Global Positioning System
GSM: Global System for Mobile Communications
HSPA: High Speed Packet Access
LTE: Long Term Evolution
PCH: Paging Channel
PCI: Physical Cell Indicator
PS: Packet Switched
PSC: Primary Scrambling Code
RAT: Radio Access Technology
RSCP: Received Signal Code Power
RSRP: Reference Signal Received Power
UE: User Equipment
UMTS: Universal Mobile Telecommunications System
WiMAX: Worldwide Interoperability for Microwave Access
WLL: Wireless Local Loop

TERMINOLOGY

The following is a glossary of terms used in the present application:

Memory Medium—A memory medium is a non-transitory medium configured for the storage and retrieval of information. Examples of memory media include: various kinds of semiconductor-based memory such as RAM and ROM (including various kinds of static RAM and various kinds of dynamic RAM, and PROM, EPROM, EEPROM and flash memory of various kinds); various kinds of magnetic media such as magnetic disk, tape, strip and film; various kinds of optical media such as CD-ROM, DVD-ROM and holographic media; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, a user equipment device, or other device or combinations of devices. In general, the term "computer system" can be broadly defined to encompass any device (or combination of devices) having at least one processor that executes instructions stored in a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed).

Figure 2:
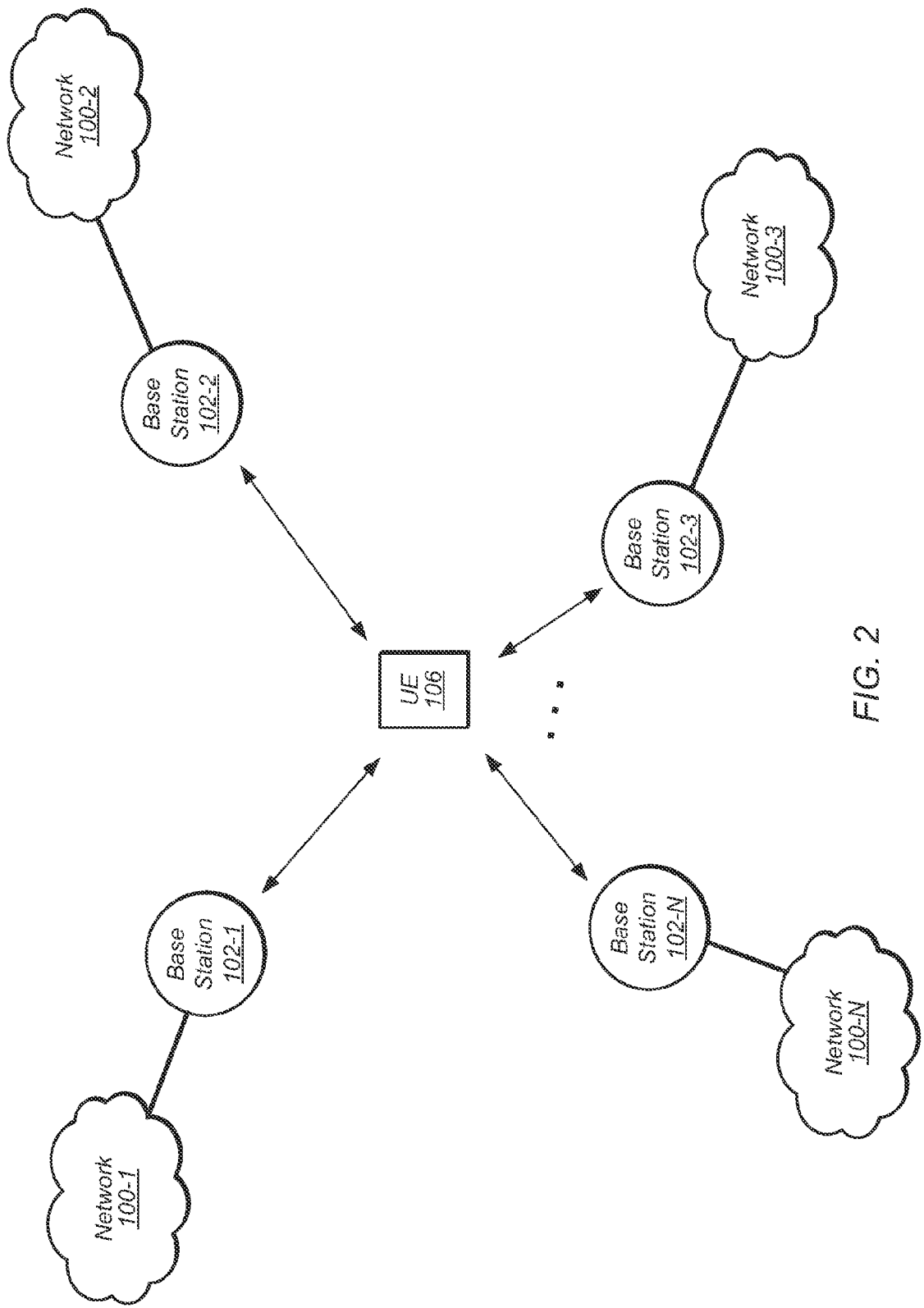
FIG. 2 illustrates an example of a wireless communication system according to one possible implementation.

FIG. 2: Communication System

FIG. 2 illustrates one example of a wireless communication system that may be used to perform any of the methods described herein. As shown, the wireless communication system includes networks 100-1 through 100-N and base stations 102-1 through 102-N, where N is greater than one. Each of the base stations 102-1 through 102-N couples to a corresponding one of the networks 100-1 through 100-N. Furthermore, each of the base stations is configured to communicate wirelessly with mobile devices according to one or more wireless communication standards, e.g., standards such as GSM, GPRS, UMTS, LTE, WLL, WAN, WiFi, WiMAX, CDMA2000, Bluetooth, GNSS, GPS, etc. For example, base station 102-1 may be configured to communicate according to the UMTS standard, and base station 102-2 may be configured to communicate according to the LTE standard.

The base stations 102-1 through 102-N may be spatially distributed so as to provide continuous (or nearly continuous) overlapping service to UE 106 via one or more cellular communication standards. Each base station has an associated spatial region, i.e., a cell, over which it wirelessly communicates with mobile devices.

Mobile device 106, also referred to as user equipment (UE) 106, is configured to communicate wirelessly using two or more communication standards, e.g., communication standards such as GSM, UMTS, LTE, WLL, WAN, WiFi, WiMAX, CDMA2000, Bluetooth, GNSS, GPS, etc. For example, mobile device 106 may be configured to wirelessly communicate using both the UMTS standard and the LTE standard. The UE 106 may communicate with different ones of the base stations at different times. For example, the UE 106 may initially communicate with base station 102-1, and then, after moving closer to base station 102-2, may start communicating with base station 102-2. The UE 106 may measure the signal strength of different base stations in order to make intelligent decisions on which base station to communicate with at any given time. Furthermore, the UE 106 may use different base stations for different communication purposes. For example, to communicate circuit-switched data such voice data or video data, the UE may communicate with a first base station that is configured to handle such data, e.g., a UMTS base station. However, when packet-switched data becomes available, the UE may use another one of the base stations, e.g., an LTE base station. LTE base stations are able to handle packet-switched data at a higher rate than UMTS base stations.

Each of the base stations 102-1 through 102-N includes hardware for communicating wirelessly with mobile devices. For example, each base station may include a radio transceiver (or set of radio transceivers) and one or more antennas. In addition, the base stations enable the mobile devices to communicate with the networks 100-1 through 100-N. The networks may couple to the PSTN and/or to the Internet. Thus, the base stations and the networks enable the mobile devices to conduct telephone conversations and/or access the Internet. The networks 100-1 through 100-N are not necessarily distinct networks. For example, they may be controlled by one or more wireless communication providers or network operators.

In some implementations, the UE 106 may be configured to communicate with base stations according to a first cellular communication standard (such as UMTS) that handles circuit-switched and packet-switched communications, and configured to communicate with other base stations according to a second cellular communication standard (such as LTE) that handles packet-switched data at a higher data rate.

Figure 3:
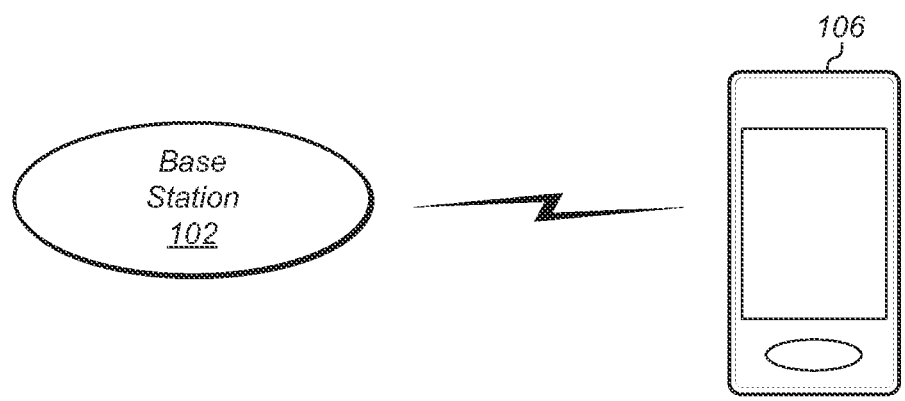
FIG. 3 illustrates a base station 102 in communication with user equipment 106 according to one possible implementation.

FIG. 3 illustrates one example of user equipment 106 in communication with a base station 102 (e.g., one of the base stations 102-1 through 102-N described above). The UE 106 may be a device with wireless network connectivity such as a mobile phone, a cell phone, a hand-held device, a tablet computer, a personal digital assistant, a media player, or virtually any type of wireless device.

The UE 106 may include a processor that is configured to execute program instructions stored in memory. The UE may perform any of the methods embodiments described herein by executing such stored instructions. In some implementations, the UE may include a programmable hardware element such as an FPGA (field-programmable gate array) that is configured to perform any of the method embodiments described herein, or any portion of any of the method embodiments described herein. In some implementations, the UE may include dedicated digital circuitry (such as an ASIC) that is configured to perform any of the method embodiments described herein, or any portion of any of the method embodiments described herein.

The UE 106 may include one or more antennas for communicating using one or more wireless communication standards. In some embodiments, the UE 106 may share one or more parts of a receive and/or transmit chain between a plurality of wireless communication standards. For example, the UE 106 might be configured to communicate using either of UMTS or LTE using a single shared radio. The shared radio may include a single antenna, or may include a plurality of antennas (e.g., enabling MIMO operation) for performing wireless communications. In other embodiments, the UE 106 may include separate transmit and/or receive chains (e.g., including separate antennas and other radio components) for each wireless communication standard with which it is configured to communicate. In still other embodiments, the UE 106 may include one or more radios which are shared between a plurality of wireless communication standards, and one or more radios which are used exclusively by a single wireless communication standard. For example, in one set of embodiments, the UE 106 may include a shared radio for communicating using either of LTE or UMTS, and separate radios for communicating using each of Wi-Fi and Bluetooth. A wide variety of other configurations are also possible.

Figure 4:
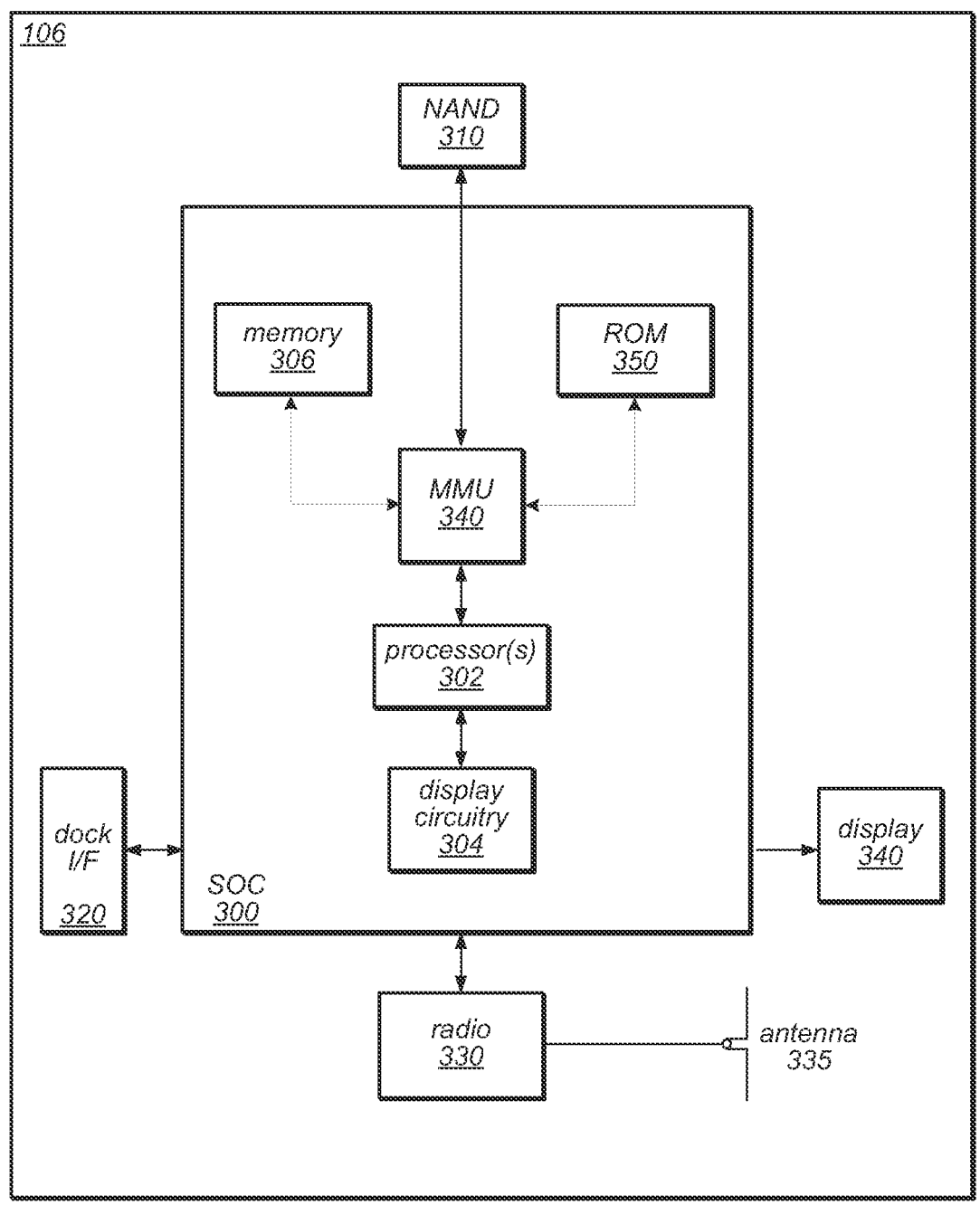
FIG. 4 illustrates an example block diagram of the user equipment device 106, according to one possible implementation.

FIG. 4—Example Block Diagram of User Equipment 106

FIG. 4 illustrates a block diagram of the UE 106 according to one possible implementation. As shown, the UE 106 may include a system on chip (SOC) 300, which includes portions for various purposes. For example, as shown, the SOC 300 may include processor(s) 302 which execute program instructions for the UE 106 and display circuitry 304 which performs graphics processing and provides display signals to the display 340. The processor(s) 302 may be coupled to memory management unit (MMU) 340. MMU 340 may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some implementations, the MMU 340 may be included as a portion of the processor(s) 302.

In the embodiment shown, ROM 350 may include a bootloader, which may be executed by the processor(s) 302 during boot up or initialization. Furthermore, the SOC 300 may be coupled to various other circuits of the UE 106. For example, the UE 106 may include various types of memory (e.g., including NAND flash 310), a connector interface 320 (e.g., for coupling to an external computer system), the display 340, and wireless communication circuitry (e.g., for communication via communication standards such as UMTS, LTE, CDMA2000, Bluetooth, WiFi, GNSS, GPS, etc.).

The UE device 106 may include at least one antenna, and in some implementations a plurality of antennas, for performing wireless communication with base stations and/or other devices. For example, the UE device 106 may use antenna 335 to perform the wireless communication. As noted above, the UE may be configured to communicate wirelessly using a plurality of wireless communication standards in some embodiments.

As described herein, the UE 106 may include hardware and software components for implementing a method for reselecting from one cell to another as variously described herein. FIG. 5 and the attending description relate to one such method.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

FIG. 5—Method for Efficiently Performing Cell Reselection

A method 500 for operating user equipment (e.g., user equipment 106) may be performed as shown in FIG. 5. (Furthermore, the method 500 may include any subset of the features, elements and embodiments described above.) The method 500 may be used to efficiently reselect from one cell to another. In particular, the method 500 may be used to reselect from a first cell configured for wireless communication according to a first wireless communication standard to a second cell configured for wireless communication according to a second wireless communication standard. It may be advantageous to switch to such a second cell when one is available because the second wireless communication standard may require the transfer of packet-switched data at a higher data rate (between UE and base station) than the first wireless communication standard. Since the second cell is configured for communication according to the second wireless communication standard, it will support the transfer of packet-switched data at that higher data rate.

As indicated at 505, while camped on a first base station that is configured to communicate wirelessly according to the first wireless communication standard, the user equipment (e.g., a processor of the user equipment) may perform a set of operations including operations 510 through 530, as described below. The first wireless communication standard may be the UMTS standard. However, in other implementations, the first wireless communication standard may be some other standard, e.g., GSM or CDMA.

At 510, the user equipment (UE) may initiate a search procedure to detect a second base station that is configured to communicate wirelessly according to a second wireless communication standard. The search procedure may include stepping or scanning through the frequency band(s) associated with the second wireless communication standard, e.g., by tuning the local oscillator signal of the UE's radio frequency receiver to successive frequencies within the frequency band(s) to detect substantial signal energy at one of the frequencies, i.e., energy due to base station transmissions. In response to acquiring the signal transmitted by the second base station, the UE demodulates the signal to identify the physical cell identity of the second base station. In some embodiments, the demodulation may be performed by specialized signal processing circuitry, e.g., in a DSP chip and/or in a programmable hardware element.

The user equipment may be configured to make measurements of the signal strength of the second base station. The measurements may be based on digitized samples of the signal received from the second base station. The measurements may be, e.g., measurements of received signal strength and/or reference signal received power. Mechanisms for computing such measurement values from received signal data are well known in the art of wireless communication.

At 515, the user equipment may start a reselection timer for the second base station (e.g., the T_reselection timer as described above) in response to determining that a current measurement of signal strength of the second base station is stronger than a threshold value. The threshold value may be signaled by the network through one or more system information messages.

As indicated at 520, in response to receiving a request for a data transfer (or receiving a signal indicating a data transfer) to be performed, the user equipment may save information including at least a remaining time value of the reselection timer, and perform the data transfer according to the first wireless communication standard using the first base station. The information may be saved in a memory of the user equipment. The request may be (or include) a request for radio bearer (RB) setup or a reconfiguration request from the base station assigning the UE a radio bearer for data.

In some embodiments, the saved information may also include the current measurement of signal strength (e.g., the measurement used in the determination of step 515) and/or one or more previous measurements of signal strength prior to the current measurement.

As indicated at 525, in response to transitioning to a non-active protocol state after completing the data transfer, the user equipment may perform an additional measurement of the signal strength of the second base station, and determine if the second base station satisfies one or more reselection criteria. The one or more reselection criteria may be based at least on the additional measurement and the saved remaining time value of the reselection timer. In some embodiments, the one or more reselection criteria may be based on the saved measurement, the additional measurement and the saved remaining time value of the reselection timer.

The non-active protocol state is a state that indicates there is no data that presently needs to be transferred. For example, the non-active protocol state may be a state where the communication controller of the user equipment is parked on a paging channel (e.g., the UMTS paging channel).

As indicated at 530, in response to determining that the second base station satisfies the one or more reselection criteria, the user equipment may reselect to the second base station to enable data transfers with the second base station according to the second wireless communication standard. The action of reselecting to the second base station may include re-tuning the radio frequency receiver from the first base station to the second base station and performing registered service resumption. (The UE may reselect to the cell on the second communication standard and then read the system information on that cell, and later send an Update Request to the network for all the PS and CS services it registered for on the first communication standard.)

When data becomes available for transfer (e.g., from a software application executing on the user equipment), the user equipment may transfer the data to the second base station using the second wireless communication standard.

In some implementations, the second wireless communication standard is LTE or any high-priority radio access technology.

In some embodiments, the second wireless communication standard may correspond to a femtocell (e.g., a UMTS femtocell or an LTE femtocell or a CDMA-EVDO femtocell) which is configured with higher priority than the current network.

It is also possible that the second base station may fail to satisfy the one or more reselection criteria. (Reselection to the second base station may be disabled if the second base station fails to satisfy any of the criteria.) In response to determining that the second base station does not satisfy the one or more reselection criteria, the user equipment may initiate the search procedure (e.g., return to operation 510) to detect another base station that is configured to communicate wirelessly according to the second wireless communication standard.

In some embodiments, the one or more reselection criteria may include the criterion that the additional measurement (or, at least the additional measurement) be greater than a power threshold, e.g., a threshold that is the same as or close to the threshold used in operation 515 to condition the start of the reselection timer.

In some embodiments, the one or more reselection criteria may include the criterion that the additional measurement and one or more saved measurements (i.e., measurements included in the saved information of operation 520) are greater than a power threshold.

In some embodiments, the one or more reselection criteria may include the criterion that an average of the additional measurement and one or more saved measurements (i.e., measurements included in the saved information of operation 520) is greater than a power threshold.

In some embodiments, the one or more reselection criteria may include the criterion that Srxlev (as defined in 3GPP standards 36.133 and 25.304) is greater than Threshx_high (as defined in the 3GPP standard 36.133). The value Threshx_high is configured by the network. Srvlev is a measure of the degree of suitability of the cell for reselection.

In some embodiments, the one or more reselection criteria may include the criterion that a measured time duration of the above-described data transfer is greater than or equal to the saved remaining time value. (To facilitate the measurement of this time duration and other timing functions, the UE may include a dedicated clock and timing circuitry. The time duration of the data transfer may be determined, e.g., by saving a value of the clock before and after the data transfer, and then computing a difference of the two values.) The measured data transfer duration will often be greater than the saved remaining time value.

If the measured data transfer duration is less than the saved remaining time value, the UE may abort reselection to the second base station. In one alternative embodiment, if the measured data transfer duration is less than the saved remaining time value, the UE may subtract the measured data transfer duration from the saved remaining time value to obtain a resultant value, and restart the reselection timer with the resultant value. The UE may then wait until the reselection timer expires before reselecting to the second base station.

Mechanism for Reselection from UMTS to LTE

In some implementations, the user equipment (UE) may reselect from UMTS to LTE as follows. Any of these implementations may include any subset of the features, elements and embodiments described above.

(1) The UE is in PCH, and discovers a strong LTE cell that meets the reselection criteria, and T_reselection is running in the background. The reselection criteria may include, e.g., the reselection criteria specified in the 3GPP standards 25.304 and 36.133.

(2) When the UE needs to send data or receives a radio bearer (RB) setup for data in UMTS, the UE may save (a) the previous measurement result (or results) made on the LTE cell and (b) the current value of the T reselection timer.

Furthermore, the UE performs the required packet-switched and/or data procedure(s) on UMTS. For example, a packet-switched procedure might include sending a routing area update message and/or sending a service request for a data transfer.

(3) Later, when the UE moves back to PCH (on the W cell), the UE makes a measurement on the previously-measured LTE cell, evaluates the reselection criteria and performs cell reselection to the LTE cell immediately if the LTE cell meets the reselection criteria. (The term "W cell" means a Primary Scrambling code corresponding to one of three or more sectors controlled by a base station, and is used as a synonym for the "UMTS cell".)

(4) If the UE determines that the previously-measured LTE cell fails the reselection criteria, then the UE triggers an LTE detection search. In some embodiments, the LTE detection search may be a LTE detection search conforming to the 3GPP standard 36.133.

Figure 6:
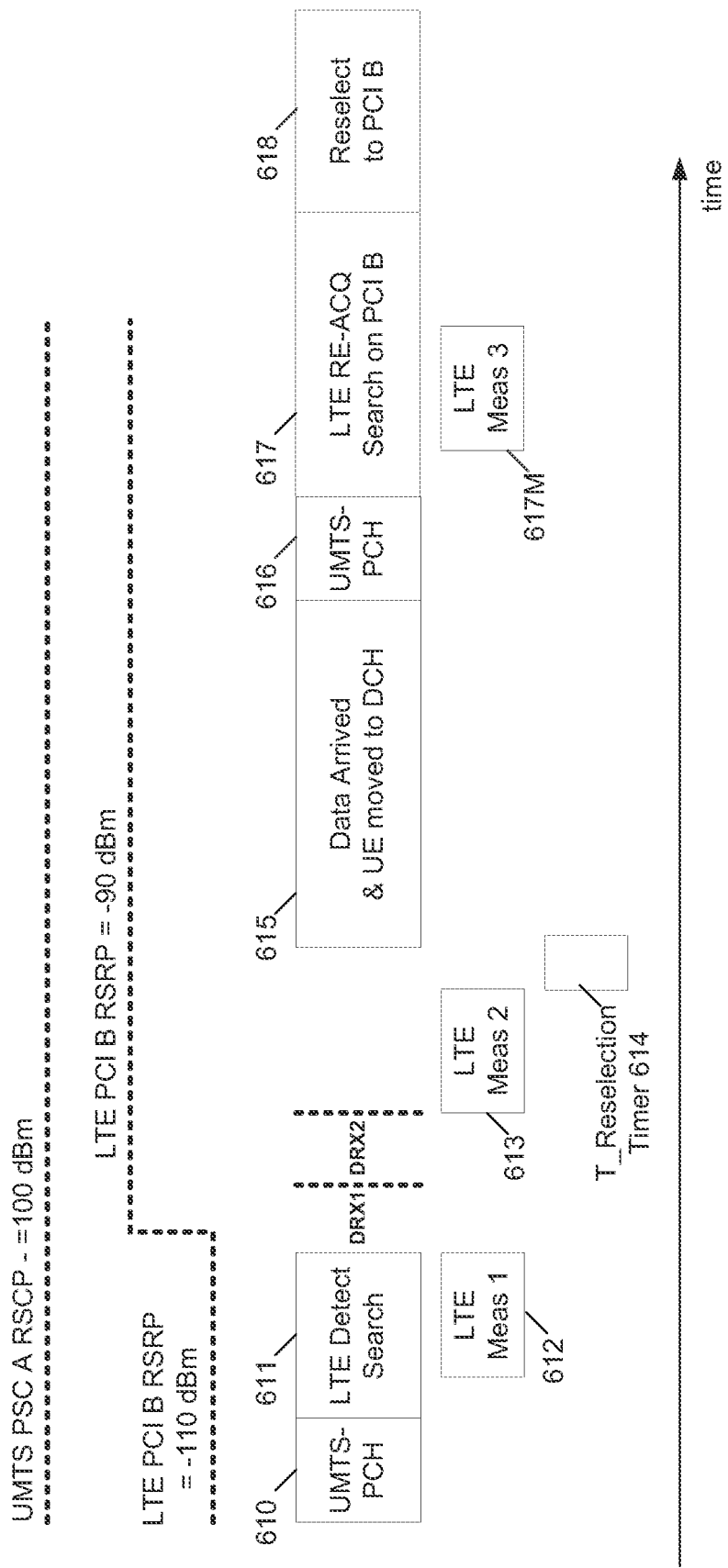
FIG. 6 is an example of the method of FIG. 5.

FIG. 6: Diagrammatic Example of Cell Reselection from UMTS to LTE

FIG. 6 shows a diagrammatic example of the above-described method for cell reselection from UMTS to LTE. The UE is initially assumed to be camped on a UMTS cell, which is referred to as "cell A" or "UMTS cell A".

At 610, the UE is in the UMTS-PCH state.

At 611, the UE performs an LTE detection search, e.g., as described above. The LTE detection search results in the detection of an LTE cell, which is referred to as "cell B" or "LTE cell B" to distinguish it from the UMTS cell A.

At 612, the UE makes a first measurement of signal strength (e.g., RSRP) of the LTE cell B. Suppose that the RSRP of the LTE cell B is too small to consider reselection to the LTE cell B, i.e., smaller than a predetermined threshold.

After the passage of time, e.g., after a number of DRX cycles, the UE makes a second measurement 613 of the signal strength of the LTE cell B. In response to determining that the second measurement is large enough to consider reselection (i.e., larger than the predetermined threshold), the UE starts a T_reselection timer 614 for the LTE cell B.

At 615, data that needs to be transmitted arrives (e.g., from a software application executing on the UE), and thus, the current value of the T_reselection timer is saved in memory, and the UE moves to the DCH channel to transmit the data according to the UMTS standard. When the UE has completed the transmission of the data, the UE returns to the UMTS-PCH state 616. (The T_reselection timer may be interpreted as continuing to run in an indirect sense during the data transfer because the timer value is saved before the data transfer and the current time is re-checked after the transfer is complete. The difference may be computed and counted towards the required T_reselection time.)

In response to entering the UMTS-PCH state, the UE may initiate an LTE re-acquisition search 617 on the PCI of the LTE cell B. (PCI is an acronym for Physical Cell Indicator.) The re-acquisition search includes making one or more measurements (such as measurement 617 M) on the PCI of the LTE cell B until the reselection criteria are satisfied, and immediately reselecting to the LTE cell B, e.g., without running any of the UMTS-required timers. The re-selection step is shown at 618.

Any of the various embodiments described herein may be realized in any of various forms, e.g., as a computer-implemented method, as a computer-readable memory medium, as a computer system, or as a system. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system 700 may be configured to include a processor (or a set of processors) 710 and a memory 715, e.g., as shown in FIG. 7. The memory stores program instructions. The processor is configured to read and execute the program instructions from the memory. The program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a mobile phone, a personal digital assistant, a media player, a wearable computer, etc.

The computer system 700 may also include an antenna subsystem 722. The antenna subsystem 722 includes one or more antennas, which are configured to transmit and receive wireless communication signals, e.g., as variously described above. The computer system 700 may also include a user interface 715 including a display (e.g., a touch-sensitive display). The user interface 715 may also include one or more interface devices such as one or more buttons, one or more microphones, one or more speakers, one or more accelerometers, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating user equipment, the method comprising: while camping on a first base station that is configured to communicate wirelessly according to a first wireless communication standard: initiating a search procedure to detect a second base station that is configured to communicate wirelessly according to a second wireless communication standard; starting a reselection timer for the second base station in response to determining that a first measurement of signal strength of the second base station is stronger than a threshold value; in response to receiving a request for a data transfer to be performed, saving at least a remaining time value of the reselection timer, and performing the data transfer according to the first wireless communication standard using the first base station; in response to transitioning to a non-active protocol state after completing the data transfer, performing an additional measurement of the signal strength of the second base station, and determining if the second base station satisfies one or more reselection criteria based at least on (a) the additional measurement being greater than a power threshold and (b) the saved remaining time value, wherein the one or more reselection criteria include the criterion that a measured time duration of said data transfer according to the first wireless communication standard is greater than or equal to the saved remaining time value; in response to determining that the second base station satisfies the one or more reselection criteria, reselecting to the second base station to enable data transfers with the second base station according to the second wireless communication standard.

2. The method of claim 1, wherein the second communication standard requires the transfer of packet-switched data at a higher data rate than the first communication standard.

3. The method of claim 1, wherein the first wireless communication standard is UMTS, and the second wireless communication standard is LTE.

4. The method of claim 1, further comprising:
in response to determining that the second base station does not satisfy the one or more reselection criteria, initiating a search procedure to detect a third base station that is configured to communicate wirelessly according to the second wireless communication standard.

5. The method of claim 1, wherein said receiving a request for a data transfer to be performed includes receiving a request for radio bearer (RB) setup for data in UMTS.

6. The method of claim 1, wherein the user equipment includes a radio transceiver system that is used both for wireless transmissions according to the first wireless communication standard and for wireless transmissions according to the second wireless communication standard.

7. A non-transitory memory medium storing program instructions that are executable by a processor in a user equipment (UE) device, wherein the program instructions, when executed by the processor, cause the processor to implement: while camping on a first base station that is configured to communicate wirelessly according to a first wireless communication standard: initiating a search procedure to detect a second base station that is configured to communicate wirelessly according to a second wireless communication standard; starting a reselection timer for the second base station in response to determining that a first measurement of signal strength of the second base station is stronger than a threshold value; in response to receiving a request for a data transfer to be performed, saving at least a remaining time value of the reselection timer, and performing the data transfer according to the first wireless communication standard using the first base station; in response to transitioning to a non-active protocol state after completing the data transfer, performing an additional measurement of the signal strength of the second base station and determining if the second base station satisfies one or more reselection criteria based at least on (a) the additional measurement being greater than a power threshold and (b) the saved remaining time value, wherein the one or more reselection criteria include the criterion that a measured time duration of said data transfer according to the first wireless communication standard is greater than or equal to the saved remaining time value; in response to determining that the second base station satisfies the one or more reselection criteria, reselecting to the second base station to enable data transfers with the second base station according to the second wireless communication standard.

8. The memory medium of claim 7, wherein the second communication standard requires the transfer of packet-switched data at a higher data rate than the first communication standard.

9. The memory medium of claim 7, wherein the program instructions, when executed by the processor, further cause the processor to implement:
in response to determining that the second base station does not satisfy the one or more reselection criteria, initiating a search procedure to detect a third base station that is configured to communicate wirelessly according to the second wireless communication standard.

10. The memory medium of claim 7, wherein said receiving a request for a data transfer to be performed includes receiving a request for radio bearer (RB) setup for data in UMTS.

11. A user equipment (UE) device comprising: an antenna subsystem including one or more antennas, wherein the one or more antennas are configured to receive and transmit wireless communication signals; a processor; and memory storing program instructions, wherein the program instructions, when executed by the processor, cause the processor to, while camping on a first base station that is configured to communicate wirelessly according to a first wireless communication standard: initiate a search procedure to detect a second base station that is configured to communicate wirelessly according to a second wireless communication standard; start a reselection timer for the second base station in response to determining that a first measurement of signal strength of the second base station is stronger than a threshold value; in response to receiving a request for a data transfer to be performed, save at least a remaining time value of the reselection timer, and perform the data transfer according to the first wireless communication standard using the first base station; in response to transitioning to a non-active protocol state after completing the data transfer, perform an additional measurement of the signal strength of the second base station and determining if the second base station satisfies one or more reselection criteria based at least on (a) the additional measurement being greater than a power threshold and (b) the saved remaining time value, wherein the one or more reselection criteria include the criterion that a measured time duration of said data transfer according to the first wireless communication standard is greater than or equal to the saved remaining time value; in response to determining that the second base station satisfies the one or more reselection criteria, reselect to the second base station to enable data transfers with the second base station according to the second wireless communication standard.

12. The user equipment of claim 11, wherein the second communication standard requires the transfer of packet-switched data at a higher data rate than the first communication standard.

13. The user equipment of claim 11, wherein the program instructions, when executed by the processor, further cause the processor to implement:

in response to determining that the second base station does not satisfy the one or more reselection criteria, initiating a search procedure to detect a third base station that is configured to communicate wirelessly according to the second wireless communication standard.

14. The user equipment of claim 11, wherein the user equipment includes a radio transceiver system that is used both for wireless transmissions according to the first wireless communication standard and for wireless transmissions according to the second wireless communication standard.

* * * * *